United States Patent [19]
Gewirtz

[11] 4,302,099
[45] Nov. 24, 1981

[54] PROGRAMMABLE COMPUTING ENLARGING EXPOSURE METER

[76] Inventor: Stanley J. Gewirtz, 435 W. 119 St., New York, N.Y. 10027

[21] Appl. No.: 52,118

[22] Filed: Jun. 26, 1979

[51] Int. Cl.³ .............................................. G03B 27/80
[52] U.S. Cl. ....................................... 355/68; 355/83; 356/443
[58] Field of Search ..................................... 355/35–38, 355/67–71, 77, 83; 356/443, 444

[56] References Cited

U.S. PATENT DOCUMENTS 3,874,793  4/1975  Nielsen .................................. 355/68
4,199,252  4/1980  Vermeulen ........................... 355/68

*Primary Examiner*—George H. Miller, Jr.
*Assistant Examiner*—W. J. Brady
*Attorney, Agent, or Firm*—Stanley J. Gewirtz; Fredrick A. Wein

[57] ABSTRACT

A Programmable Computing Enlarging Exposure Meter determines printing and contrast grades and shadow speeds and contrast grades of photosensitive material measuring printing density and contrast of film in its light path, with its unique analog computer it determines the necessary contrast grade and the exposure time required to produce a print of the necessary density. All computations and determinations are performed internally without requiring user extrapolating in the dark with calculator dials and attached slide rules that are the practice with instruments designed for the purpose.

The structure comprises a power supply, light measuring device, a light to voltage converter for converting the light measurement to one or more linearly proportional voltages having range of 1:10 between them.

An operational amplifier produces fixed output voltage. An $R_1$ inverting input variable log taper resistor calibrated against the paper speed and paper grade scales on the front panel, an $R_f$ variable log taper resistor connected between the output of the operational amplifier and the junction of the inverting input and $R_1$, and is linearly calibrated to the exposure time scale associated with the panel of the meter. Resistor $R_1$ connects the operational amplifier to the output of the light to voltage converter.

Since the operational amplifier produces a fixed output voltage, $R_1$ and $R_f$ are used against each other for accurate multiplication and division. The meter announces completion of measurements and calculations in process, by the fixed voltage output of the operational amplifier triggering and latching a thyristor circuit, which energizes an annunciator L.E.D. The results of the process is now read against the appropriate panel scale.

6 Claims, 6 Drawing Figures

FIG. 2 PREFERRED EMBODIMENT

PROGRAMMABLE COMPUTING ENLARGING EXPOSURE METER

BACKGROUND OF THE INVENTION

The present invention relates to photographic equipment and more specifically to a programmable computing enlarging exposure meter which performs all photometric measurements and calculations associated with color and black and white print exposure.

PRIOR ART

In the photographic arts, the problems of selecting the correct contrast grades of film and paper appropriate to the printing of a particular film, and providing a variable illumination as a function of a film and print density is fundamental and well known. Several types of devices and methods have been devised to cope with these problems. For example: in a low initial cost static approach, a film negative with various density wedges calibrated in seconds is placed over a piece of printed paper. The desired magnification and lens stop is selected and the paper is exposed through the wedge for a calibrated long period of time. The paper is then developed, processed and viewed to select the wedge providing the most desirable printing result. The negative is then reprinted at the same magnification and lens opening for the time period marked in the wedge. If the print proves out of range of the wedge, the lens is either opened up or closed down as a multiple of the original exposure time used to remake the test print and the procedure continues. In a high initial cost instrumentation approach, a precision densitometer enables the user to measure specific areas of a negative to be printed and then to calculate the required contrast grade and exposure time for a precision enlarging lense. A moderate initial investment instrumentation approach involves an enlarging computer usually correlating one paper speed to a particular F stop of any enlarging lens and provides an attached slide-rule calculator for the user to correlate other paper speeds to the other lens stops; or if they are more sophisticated, they will measure light on the easel from various points on the film and enable the user to insert the measured values one at a time into an attached special purpose circular slide rule called a "Calculator Dial". The user may then perform operations which will result in his being enabled to select the appropriate grade of paper and exposure time.

The present invention eliminates the need for repeated test prints. If paper speed is known, no test print is necessary; and eliminates the need for precision enlarger lenses. Measurement is taken on the easel with any enlarging lens set at the F stop desired and the paper speed programmer set to the speed of the desired paper. The exposure scale knob is then moved up scale until an annunciator signals completion of measurement and calculation. In the present embodiment, this computation takes less than four seconds for actual measurement and computation, relating to exposure time. Measurements and paper grade determinations are accomplished in less than twelve seconds. All determinations and measurements are accomplished without user need to operate a slide rule or calculator.

SUMMARY OF THE INVENTION

In a programmable computing enlarging exposure meter powered by a dual polarity power supply, a photo detector measures illumination and in conjunction with conditioning circuitry produces an illumination to voltage conversion whose output is very stable and linearly proportional to the light impinging on the photo detector. The voltage output of said converter is fed to $R_1$ of the analog computer.

An analog computer comprising an operational amplifier having an inverting input and an output, a first calibrated variable resistor associated with the paper-speed and paper grade scales connected in series between the inverting input of the operational amplifier and the output of the converter, a second calibrated variable resistor associated with the exposure time scale is series connected between the output of the operational amplifier and the inverting input. The output of the operational amplifier is fixed to a known voltage point, by connecting the output of the amplifier through a current limiting resistor to a known firing point thyristor whose output is coupled to an annunciator which is used to signal the attainment of the fixed known output voltage.

Setting the paper speed programmer to a firm value and moving the exposure time scale up from one second to longer time values causes the resistance of $R_f$ to increase in relationship to the paper speed $R_1$, thereby making the computer move from performing division in certain circumstances to performing multiplication.

For example, assuming the output of the operational amplifier is fixed at eight volts, the paper speed programmer is set at ANSI paper speed of 100 (0.1 on the dial) which corresponds to $R_1$ of 100K for an output of the light to voltage converter of 1 volt. The exposure seconds dial starts out at one second which corresponds to 20K. 20K/100K=0.2, 0.2×1 volt=0.2 volt or 1/5 (division) when the seconds dial reaches five seconds 100K /100K=1×1 volt=1 volt=neither multiplication or division. When exposure time reaches 40 seconds then 800K/100K=8×1 volt=8 volts and the annunciator signals the results of the measurement computation has been reached at 40 seconds or 8× multiplication. Range of calculation can range from divide by five though multiply by 2,000, a range of 10,000 to 1.

PREFERRED EMBODIMENT

Figure 1:
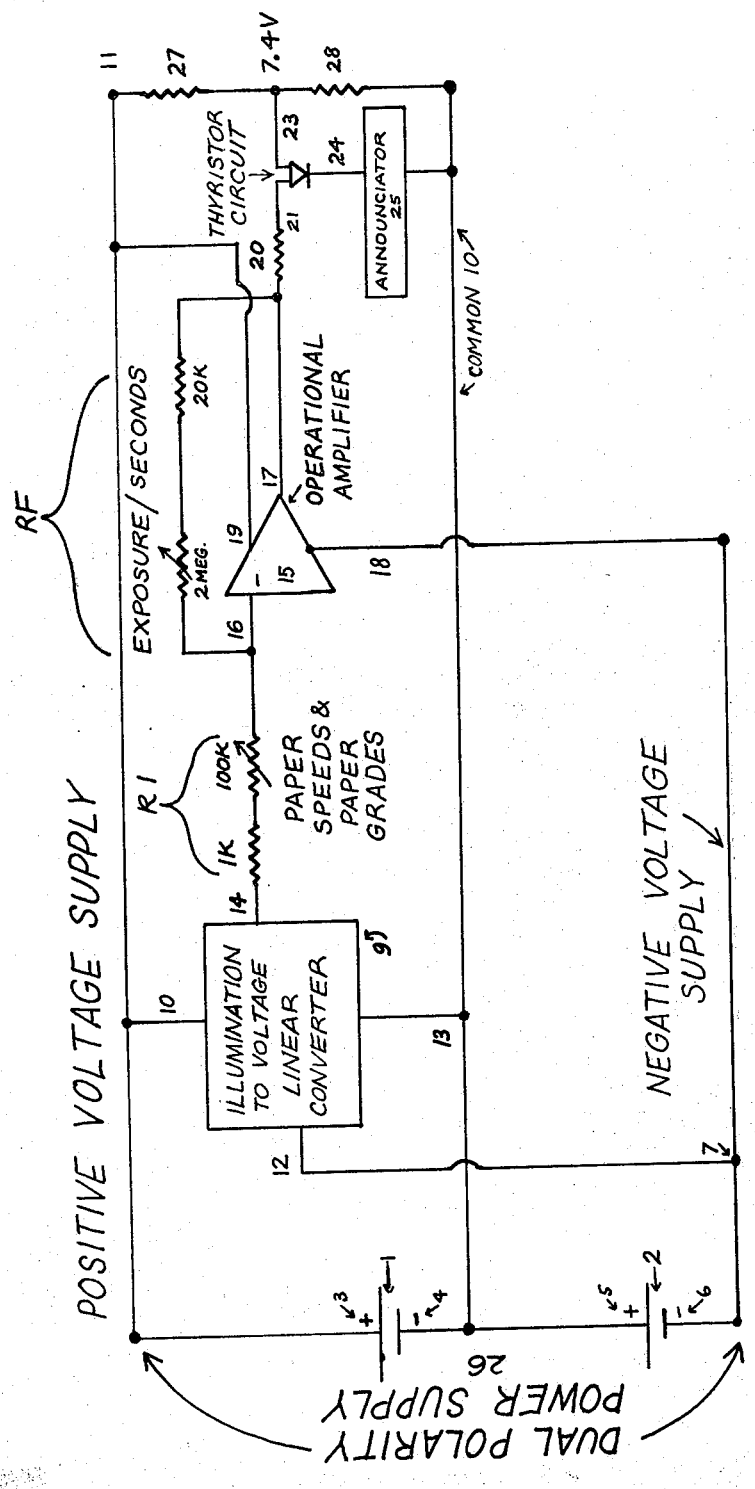
FIG. 1 is a block diagram of the programmable computing enlarging exposure meter according to the present invention.

Referring now to FIG. 1 there is shown a diagram of the basic elements of the programmable computing enlarging exposure meter. Negative terminal 4 of battery 1 is connected to a common terminal 10. Positive terminal 3 of battery 1 is connected to line 11 to provide the positive voltage supply. Positive terminal 5 of battery 2 is connected to common 10. The negative terminal 6 of battery 2 is connected to negative line 7 to provide the negative voltage supply for the electronic circuits. The positive voltage supply 11 and negative voltage supply 7 in conjunction with the common 10 make up the dual polarity power supply 26, which is needed to supply power to the illumination to voltage linear converter 9, operational amplifier 15, thyristor circuit 22, and annunciator 25 along with reference resistors 22 and 28.

Figure 2:
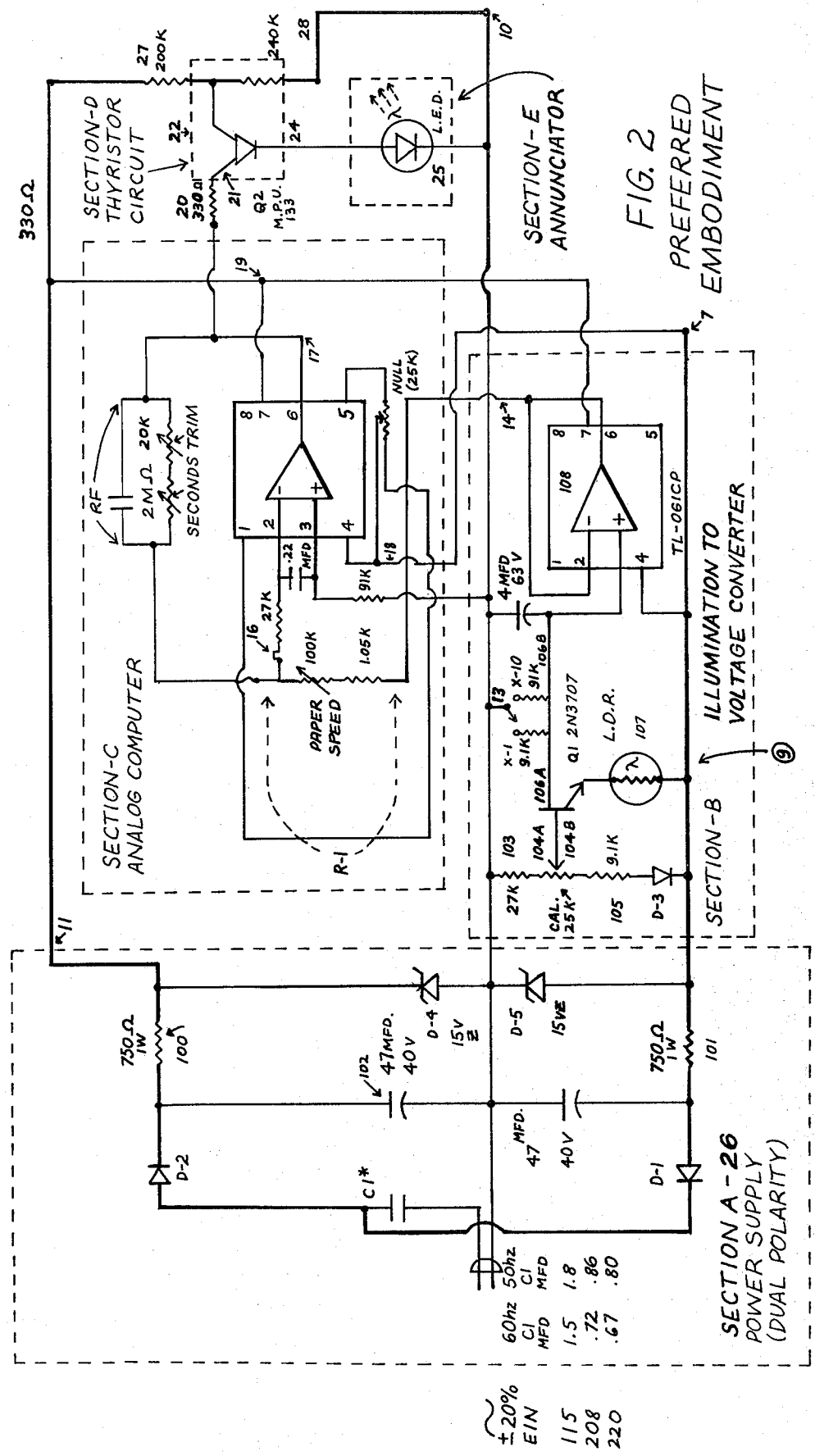
FIG. 2 is the preferred embodiment of the present invention sectioned correspondingly to FIG. 1.

Referring now to Section A of FIG. 2, the illumination to voltage linear converter 9 has a positive terminal connected to positive line 11 and a negative voltage terminal 12 connected to the negative line 7. Common referance terminal 13 is connected to the common line 10 and the output terminal 14 is connected to the input end of $R_1$ as shown in Section B of FIG. 2 and FIGS. 4 and 5.

Figure 3:
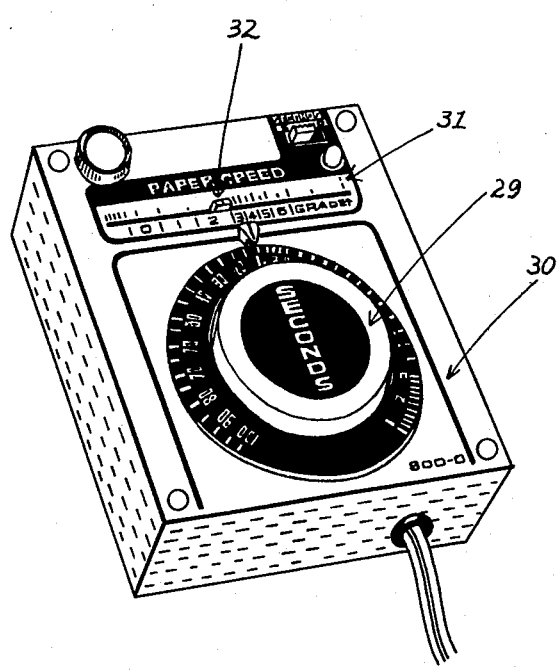
FIG. 3 is the preferred embodiment in the first commercial housing.

Operational amplifier 15 receives positive voltage through terminal 19 connected to positive line 11 and negative voltage through terminal 8 which is connected to negative line 7. The operational amplifier 15 has a functioning inverting input terminal 16 and an output terminal 17 which is connected to thyristor circuit 22 through a current limiting and latch permitting series resistor 20. The operational amplifier 15 is provided with a calculating feedback resistor $R_f$ the resistance of which is linearly proportional to the front panel associated readout time in seconds as shown in FIG. 3. The feedback resistor $R_f$ is connected between the output terminal 17 and the input terminal 16. The input resistor $R_1$ is connected between the input terminal 16 and the output terminal 14 of the illumination to voltage linear converter 9. The resistor $R_1$ has a resistance that is inversely linearly proportional to the paper speed indicator 31 and is indexed through programming cursor 32 as shown in FIG. 3, and corresponds to Section C of FIG. 2.

Thyristor circuit 22 is connected to the output 17 of amplifier 15 through current limiting resistor 20. The voltage reference of circuit 22 is established through the ratios of resistors 27 and 28 which are series connected between the positive voltage supply line 11 and common 10, with the junction of the resistors 27,28 being connected to gate 23. Cathode 24 of the thyristor circuit 22 connects to annunciator 25. The output 17 of the operational amplifier 15 is connected to the thyristor circuit 22 through a current limiting and latch permitting resistor 20. The resistor 20 limits the current that can flow from the output of the operational amplifier 15 to below the current limit of the amplifier, typically 20 ma, and maintains a current through the thrystor circuit 22 to maintain the circuit in conduction.

The annunciator 24 can be an LED as designated in Section E of FIG. 2, however, it is within the contemplation of the present invention that a magnetic or piezo-electric transducer or an audio transducer such as a "Sonalert" manufactured by Mallory Corp., or the like, can be used.

CIRCUIT OPERATION

The capacitor input power supply drops the line voltage, which can be either 115 V or 220 V AC., sinusoidal depending upon the value of the capacitor, to a 30 volts, approximating a square wave. This voltage reduction is accomplished reactively without generating heat or polarizing the input capacitor $C_1$ with a D.C. voltage across it. The positive half cycle is rectified and filtered by capacitor 102 and rectifier diode $D_2$. The negative half cycle is similarly filtered and rectified by capacitor 103 and diode $D_1$. The output voltage across the filter capacitors is conducted through a 1 watt resistor to the voltage regulating zener diodes which clamp each side of the power supply to 15 volts DC. Since each polarity is clamped to the same voltage point, the same current flows through the 1 watt resistor 100,101 and symetric current flows through capacitor $C_1$. Thus there is no DC bias generated across the capacitor $C_1$ and there is no generation of heat during the voltage drop.

Figure 4:
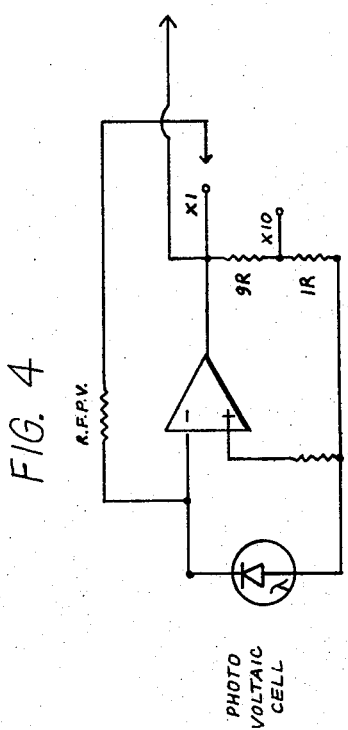
FIGS. 4 and 5 illustrate two of the alternate illumination to voltage converters.
Figure 5:
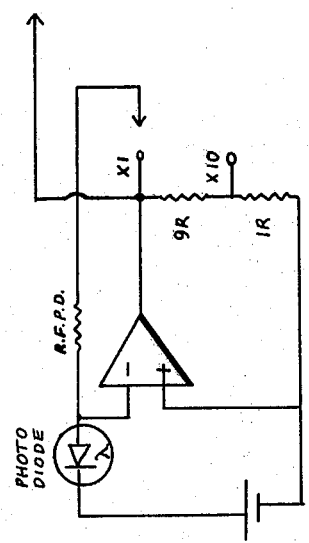

Referrance is now made to the Illumination to voltage linear converter 9 shown in FIG. 1 and Section B, FIG. 2. This is a low output impedance device with an output voltage which is accurately and linearly proportional to the light intensity being measured. In the present embodiment, a super linear broad spectrum cadmium sulfide photocell is shaded with an infrared cutoff filter which in combination with the spectral response of the photocell generates a spectral response similar to that of color printing films and reversal color printing paper. The photocell 107 has a resistance that is linearly inversely proportional to the light impinging on it. To change this to a linear voltage, it must first be converted to a linear current change. When a constant voltage is placed across the changing resistance, the current through the resistance is inversely proportional to the resistance. Thus, the two linear inverses cancel each other out and the current through the photocell becomes linearly proportional to light. This linear current must now be converted to a voltage. An emitter follower, is a unity gain voltage amplifier. In a bipolar transistor, the current flowing through the collector is equal to the current flowing through the emitter minus the base current. By placing a constant fixed voltage (which is adjustable to allow for differences in photocell sensitivity) at the base of a high beta transistor, a similar constant fixed voltage is produced at the emitter of the transistor. This constant voltage across the photocell produces a current flow through the photocell that is linearly proportional to light impinging on the photocell as explained above. The collector of the transistor now represents a constant current source with an output essentially equal to the emitter current. Thus, with a resistor in the collector circuit, the voltage across the resistor is linearly proportional to light. The multiplier-input of the analog computer changes its value by a range of over 100:1, therefore, for the voltage across resistor 106 to remain proportional to light, it must be isolated. This isolation is accomplished with an operational amplifier having the output connected directly to the inverting input thereby having a gain of 1.0. In this manner, the output of the isolation operational amplifier is an exact duplicate of the voltage across resistor 106 at the output of amplifier 108 but with an extremely low output impedance. This output 14 is the output of the voltage converter. FIGS. 4 and 5 represent alternate converters.

The analog computer as shown in Section C of FIG. 2 will not be analyzed further here since it has been amply covered earlier in this specification.

Figure 6:
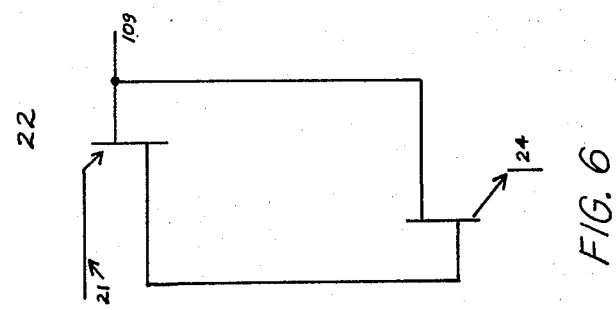
FIG. 6 is the equivalent circuit of the thyristor circuit.

Referring now to the thyristor circuit of Section D, FIG. 2:

The term thyristor as used herein, refers to a four layer device with positive feedback between 2 layers, such as silicon controlled rectifiers, shockley diodes, trigger diodes and programmable unijunction transistors. The equivalent circuit of these is basically shown in FIG. 6. The present embodiment uses a unijunction transistor which is biased with a fixed constant voltage of 8.18 volts with a moderate source impedance of 109K ohms. At the application of 8.78 volts to the base of the transistor (8.18 plus 0.6 volts for the base emitter diode)

the transistor turns on, drawing current from the moderate source impedance. The current from the source impedance is supplemented by the current through the 330 ohm current limiting latch enabling resistor thereby quickly bringing the LED to full brightness. When the voltage at the base of the unijunction goes below 3.3 volts, the current through the unijunction is not sufficient to keep the transistor in saturation and the transistor becomes non-conducting and recovers. Thus, the current through the 330 ohm resistor can be said to latch the transistor in the on condition while limiting the current through the thyristor and the LED.

While there has been illustrated and described what at present is considered to be a preferred embodiment of the present invention, it will be appreciated that numerous changes and modifications are likely to occur to those skilled in the art, and it is intended in the appended claims to cover all those changes and modifications which fall within the true spirit and scope of the present invention.

What is claimed is:

1. An exposure meter having an illumination to voltage linear converter and usable with an enlarger, comprising in combination: an operational amplifier having an inverting input serially connected to the output of the illumination to voltage linear converter through an $R_1$ variable resistor, the resistance of $R_1$ being inversely linearly related to photographic paper speed, and calibrated against paper speed and paper grade scales, an $R_f$ variable resistor connected between the operational amplifier inverting input and the output of the operational amplifier, the resistance of $R_f$ being linearly related to exposure time, and linearly calibrated to an exposure time scale, providing means for exposure indication.

2. In an exposure meter usable with an enlarger and having an illumination to voltage linear converter, the combination comprising an operational amplifier having an inverting input terminal and an output terminal, the inverting input terminal being serially connected to the output of the illumination to voltage linear converter through an $R_1$ variable resistor, the resistance of $R_1$ being inversely linearly related to photographic paper speed, and calibrated against paper speed and paper grade scales, an $R_f$ variable resistor connected between the operational amplifier inverting input and the output of the operational amplifier, the resistance of $R_f$ being linearly calibrated to an exposure time scale, providing means for exposure indication, the output of the operational amplifier being fixed at a known output voltage produced by the operational amplifier, whereby an annunciator indicating completion of the measurement calculation is activated.

3. The exposure meter of claim 2 wherein the output of the operational amplifier is serially connected to the input of a thyristor circuit through a current limiting latch enabling resistor.

4. The exposure meter of claim 3 wherein the thyristor circuit comprises a programmable unijunction transistor.

5. The exposure meter of claim 3 wherein the output of the thyristor circuit energizes an annunciator.

6. The exposure meter of claim 5 wherein the annunciator comprises a light emitting diode.

* * * * *